United States Patent
Trifiletti et al.

(10) Patent No.: US 9,799,031 B2
(45) Date of Patent: Oct. 24, 2017

(54) INTELLIGENT AUTHENTICATION

(71) Applicant: Visa International Service Association, San Francisco, CA (US)

(72) Inventors: Greg Trifiletti, Saratoga, CA (US); Olivier Brand, Walnut Creek, CA (US); Mike Lindelsee, Redwood City, CA (US); James Dimmick, Berkshire (GB); Dave Wentker, San Francisco, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 288 days.

(21) Appl. No.: 13/718,538

(22) Filed: Dec. 18, 2012

(65) Prior Publication Data
US 2013/0212018 A1    Aug. 15, 2013

Related U.S. Application Data (63) Continuation of application No. 12/826,157, filed on Jun. 29, 2010, now Pat. No. 8,364,593.
(Continued)

(51) Int. Cl.
*G06Q 20/40* (2012.01)
*G06Q 20/20* (2012.01)
*G06Q 20/32* (2012.01)

(52) U.S. Cl.
CPC ........... *G06Q 20/401* (2013.01); *G06Q 20/20* (2013.01); *G06Q 20/32* (2013.01); *G06Q 20/322* (2013.01);
(Continued)

(58) Field of Classification Search
CPC .................. G06Q 20/10; G06Q 20/40–20/401
(Continued)

(56) References Cited

U.S. PATENT DOCUMENTS

| | | |
|---|---|---|
| 7,167,830 B2 | 1/2007 | Sravanapudi et al. |
| 7,418,086 B2 | 8/2008 | Sravanapudi et al. |

(Continued)

FOREIGN PATENT DOCUMENTS

KR    10-2006-0040028    5/2006

OTHER PUBLICATIONS

Search/Examination Report dated Jan. 14, 2011 from International Patent Application No. PCT/US2010/040581, 9 pages.

*Primary Examiner* — Eric T Wong
(74) *Attorney, Agent, or Firm* — Kilpatrick Townsend Stockton LLP (57) ABSTRACT

Systems and methods for intelligently authenticating payment transactions are disclosed. A user initiates a payment transaction to purchases goods or services from a merchant. The merchant sends a payment initiation request to a server computer in communication with a payment processing network and an issuer. The server computer queries various databases to determine one or more available communication channels that may be used as authentication channels by the issuer. The server computer also determines one or more communication channels, available for use by a mobile device of the user, that may be used as authentication channels to authenticate the payment transaction. The user is provided with a list of available/eligible authentication channels. User selects one of the authentication channels and the issuer is notified of the selection. The issuer uses the selected authentication channel to communicate with the user and authenticate the payment transaction.

21 Claims, 4 Drawing Sheets

Related U.S. Application Data (60) Provisional application No. 61/221,936, filed on Jun. 30, 2009.

(52) U.S. Cl.
CPC .......... *G06Q 20/325* (2013.01); *G06Q 20/40* (2013.01); *G06Q 20/409* (2013.01)

(58) Field of Classification Search
USPC .......................................................... 705/44
See application file for complete search history.

(56) References Cited

U.S. PATENT DOCUMENTS

| | | | |
|---|---|---|---|
| 8,364,593 B2* | 1/2013 | Trifiletti et al. | 705/44 |
| 2003/0229590 A1 | 12/2003 | Byrne et al. | |
| 2005/0097320 A1* | 5/2005 | Golan | G06F 21/40 |
| | | | 713/166 |
| 2006/0006226 A1 | 1/2006 | Fitzgerald et al. | |
| 2006/0129638 A1* | 6/2006 | Deakin | H04W 8/22 |
| | | | 709/203 |
| 2007/0143230 A1 | 6/2007 | Narainsamy et al. | |
| 2007/0278290 A1 | 12/2007 | Messerges et al. | |
| 2007/0295803 A1* | 12/2007 | Levine et al. | 235/379 |
| 2008/0103972 A1* | 5/2008 | Lanc | G06Q 20/32 |
| | | | 705/44 |
| 2008/0126252 A1* | 5/2008 | Katz | G06Q 20/12 |
| | | | 705/44 |
| 2008/0162338 A1* | 7/2008 | Samuels et al. | 705/38 |
| 2008/0167017 A1 | 7/2008 | Wentker et al. | |
| 2008/0275748 A1* | 11/2008 | John | 705/7 |
| 2009/0037982 A1* | 2/2009 | Wentker et al. | 726/3 |

* cited by examiner

INTELLIGENT AUTHENTICATION

CROSS-REFERENCES TO RELATED APPLICATIONS

This application is a continuation of U.S. patent application Ser. No. 12/826,157, filed Jun. 29, 2010, which is a non-provisional application which claims the benefit under 35 U.S.C. 119 (e) of U.S. Provisional Patent Application No. 61/221,936, Jun. 30, 2009, all of which are all herein incorporated by reference.

BACKGROUND OF THE INVENTION

Mobile devices can support multiple data transfer protocols and provide multiple forms of communication channels. When mobile devices are used for payment transactions, the communication channels (i.e. voice, SMS, mobile web, etc.) may advantageously be used to enhance the security of such transactions by utilizing the available communication channels to authenticate the payment transactions.

Different entities involved in facilitating a payment transaction, may use the available communication channels and data transfer protocols to facilitate authentication of the payment transaction. Which communication channel and data transfer protocol is used may depend on several factors such as mobile device characteristics, regions where the transaction takes place, capability of various entities involved in digesting data communicated via a particular channel/protocol, etc.

In today's global market where financial transactions are performed across continents, the difference in communication standards and unavailability of some communication channels, among other factors, may inhibit an efficient use of various available communication channels of mobile devices in performing and authenticating payment transactions. A user may initiate a payment transaction with a communication channel on his mobile device, but one of the entities responsible for facilitating part of the payment transaction may not support that specific communication channel. Another entity may be able to work with that particular communication channel, but may prefer to use some other communication channel for authenticating the payment transaction.

Therefore, there is a need for systems and methods that can determine various available communication channels that entities involved in a payment transaction can work with, and intelligently choose and utilize the most suitable and supported communication channel for a specific market and user's mobile device.

Embodiments of the invention address these and other problems.

BRIEF SUMMARY

Embodiments of the invention disclosed herein include systems and methods for intelligently authenticating a payment transaction.

One embodiment of the invention is directed to a system and method for receiving a payment initiation request, at a server computer, from a merchant on behalf of a user. The server computer queries various databases to determine one or more communication channels that may be used by an issuer to authenticate the payment transaction. The server computer also determines one or more communication channels that are available for use by a mobile device of the user which may be used as authentication channels. The server computer then generates a list of eligible/available authentication channels and sends the list to the merchant. The merchant provides the list to the user, and one of the authentication channels are selected by the user. The merchant notifies the server computer about the selected authentication channel. The server computer also notifies the issuer about the selection. The issuer then communicates with the user via the selected authentication channel and authenticates the transaction.

Another embodiment of the invention is directed to a system and method for authenticating a payment transaction by an issuer. The issuer receives an authentication request and a selected authentication channel from a server computer. Thereafter, the issuer communicates with a user via the selected authentication channel to authenticate the payment transaction.

These and other embodiments of the invention are described in further detail below.

DETAILED DESCRIPTION

Embodiments of the invention disclosed herein include systems and methods for intelligently choosing and utilizing a suitable communication channel and data transfer protocol in a payment transaction with a mobile device.

In certain embodiments, a user may initiate a payment transaction with a merchant. The merchant forwards the payment initiation request to a server computer in communication with a payment processing network. The server computer determines what communication channels are available for use by a mobile device of the user. This determination process is done by either receiving the characteristics of the user's mobile device from the merchant, or by accessing a database that stores the mobile device profile of the user.

The server computer compares the communication channels, available for use by the mobile device, with a list of available authentication channels stored in an issuer profile that indicates what forms of communication channels and data transfer protocols may be used by the issuer as authentication channel to authenticate a payment transaction. The issuer profile is stored in a database which is accessible by the payment processing network and is also accessible by the server computer through the payment processing network. The server computer then generates a list of suitable communication channels that may be used as authentication channel which will be presented to the user. The user then selects one of the authentication channels and the issuer is notified about the selected authentication channel by the server computer. The issuer is associated with an account from which the user is trying to initiate a payment transaction.

In addition to the availability of certain communication channels that may be used as authentication channels by the issuers, other factors may also play a role in generating a list of suitable communication channels that may be used by the mobile device of the user as authentication channel to authenticate a payment transaction. In certain embodiments, the issuers may prefer to use a specific type of communication channel as an authentication channel, based on some criteria such as the amount of the transaction, location of the transaction, etc. In one example, if the transaction amount is above a certain limit, the issuer may choose to use a Customer Service Representative (CSR) to authenticate a transaction by directly speaking with the user. In this example, when the user initiates a payment transaction, he will receive a notification that a customer service representative will call shortly to authenticate the transactions.

Other specific examples of embodiments of the invention are described in further detail below.

I. System

Figure 1:
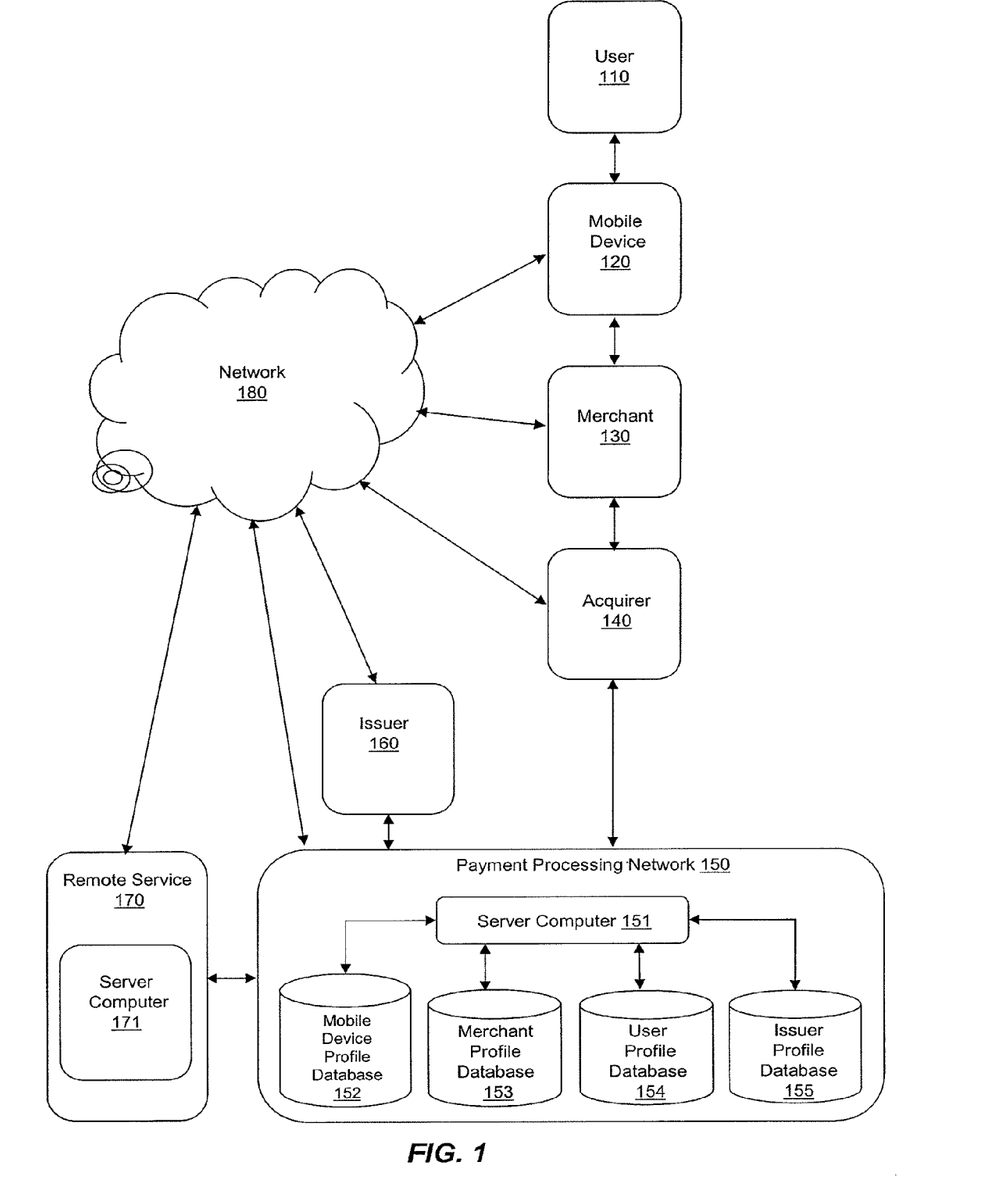
FIG. 1 shows a system according to an embodiment of the invention.

FIG. 1 is a diagram that illustrates the entities that may be involved in a payment transaction and the authentication of the payment transaction. FIG. 1 shows a user 110, a mobile device 120, a merchant 130, an acquirer 140, a payment processing network 150, an issuer 160, a remote service 170, and the network 180. The payment processing network 150 includes server computer 151, mobile device profile database 152, merchant profile database 153, user profile database 154, and issuer profile database 155. Remote service 170 includes server computer 171. It is understood that some embodiments of the invention may include more than one of the entities, and elements shown within some of the entities, in a payment transaction and the authentication of the payment transaction. In some embodiments, fewer that all of the entities may be involved in a payment transaction and authentication of the payment transaction.

User 110 is in operative communication with the mobile device 120. User 110 is also in communication with the merchant 130 through the mobile device 120. Merchant 130 is communication with acquirer 140. Acquirer 140 is in communication with issuer 160 through the payment processing network 150. Payment processing network 150 is also in communication with the remote service 170. All of the entities shown in FIG. 1 are also connected to the network 180 and may communicate with each other through the network 180.

Payment processing network 150 includes server computer 151, mobile device profile database 152, merchant profile database 153, user profile database 154, issuer profile database 155. Server computer 151 is in operative communication with mobile device profile database 152, merchant profile database 153, user profile database 154, and issuer profile database 155.

Figure 2:
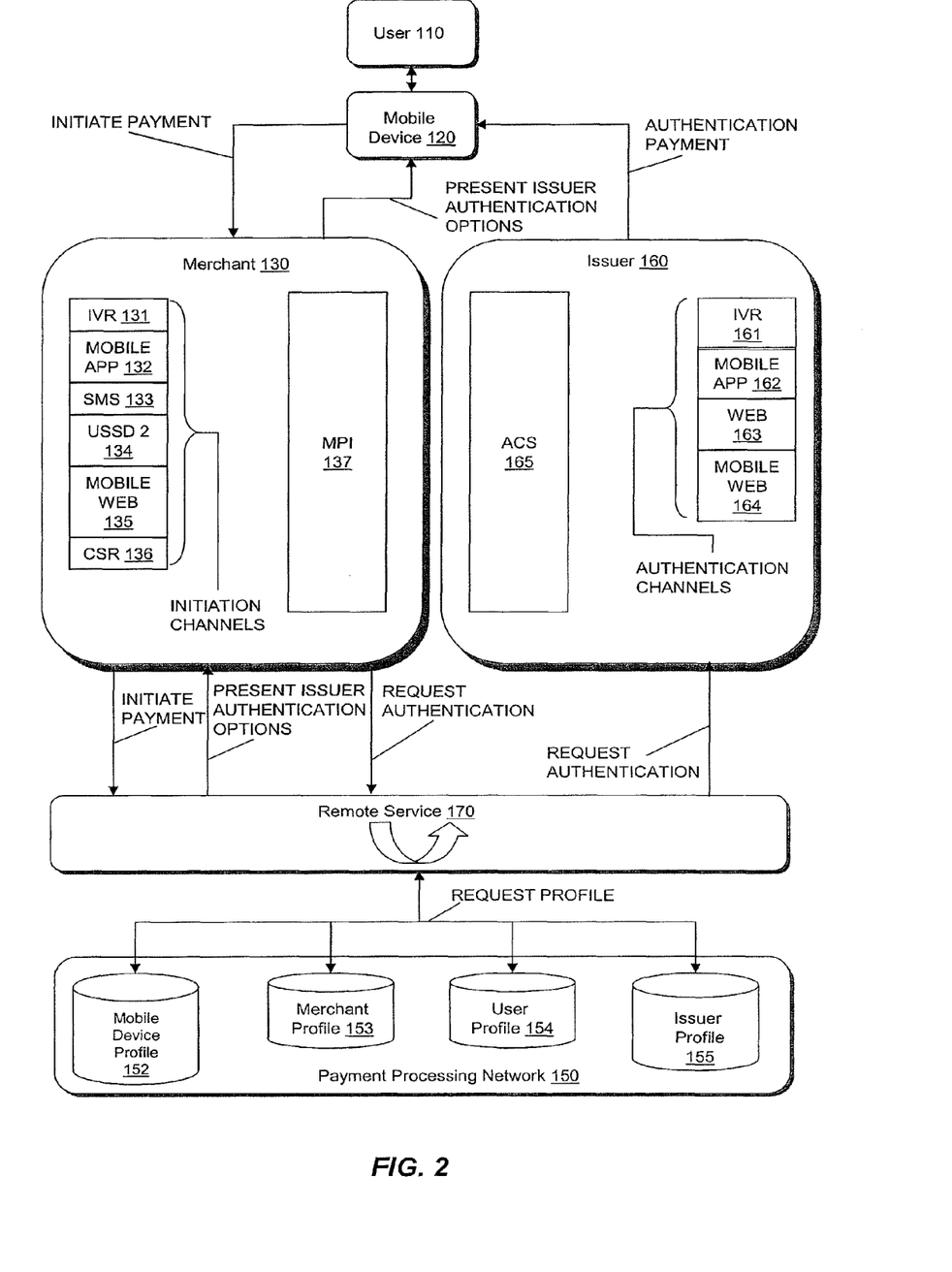
FIG. 2 shows the intelligent authentication system according to an embodiment of the invention.

FIG. 2 is a diagram that illustrates the intelligent authentication system according to an embodiment of the invention. FIG. 2 shows the user 110, mobile device 120, merchant 130, remote service 170, payment processing network 150, issuer 160. User 110 is in communication with merchant 130 through mobile device 120. Merchant 130 is in operative communication with remote service 170. Remote service 170 is in operative communication with payment processing network 150 and issuer 160. Issuer 160 is capable of communicating with the mobile device 120.

Merchant 130 has access to a series of communication channels that are used as initiation channels for payment transactions. Examples of some of these initiation channels are: Interactive Voice Response (IVR) 131, mobile application 132, Short Messaging Service (SMS) 133, Unstructured Supplementary Service Data phase 2 (USSD2) 134, mobile web 135, Customer Service Representative (CSR) 136. The merchant 130 includes a merchant plug-in 137.

Merchant 130 may have access to various means used to communicate with the user 110 using any of these initiation channels. In one example, merchant 130 may have access to a server computer (not shown) and communicate with the user 110 via mobile web 135. In this embodiment, mobile web 135 may be hosted by a server computer which allows the user 110 to initiate a payment transaction via his mobile device 120. In another example, merchant 130 may have access to computer systems including one or more server computers, databases and software applications running on the server computers to provide an Interactive Voice response (IVR) 131 that allows the user 110 to perform a payment transaction over the phone.

The issuer 160 also has access to a series of communication channels that are used as authentication channels for the payment transactions. Examples of some of these authentication channels are: Interactive Voice Response (IVR) 161, mobile application 162, website 163, mobile web 164. The issuer 160 includes an Access Control Server (ACS) 165.

Each of the elements shown in FIG. 1 and FIG. 2 is described in further detail below.

User 110 refers to an individual or organization such as a business that is capable of purchasing goods or services or making any suitable transaction with merchant 130.

Mobile device 120 may be in any suitable form. For example, suitable mobile device 120 can be hand-held and compact so that they can fit into a consumer's wallet and/or pocket (e.g., pocket-sized). Some examples of mobile device 120 include cellular phones, personal digital assistants (PDAs), pagers, payment cards, security cards, access cards, smart media, transponders, and the like. In some embodiments, mobile device 120 and a portable consumer device (Not shown) that allows the payment transaction to be conducted with merchant 130, may be embodied in the same device.

Merchant 130 refers to any suitable entity or entities that make a transaction with user 110. Merchant 130 may use any suitable method to make the transaction. For example, merchant 130 may use an e-commerce business to allow the transaction to be conducted by merchant 130 through the Internet. Other examples of merchant 130 include a department store, a gas station, a drug store, a grocery store, or other suitable business.

As shown in FIG. 2, merchant 130 and issuer 160 support a series of communication channels that may be used as initiation channels and authentication channels respectively. These initiation channels and authentication channels are described in further detail below.

Interactive Voice Response (IVR) 131 and 161 refer to systems used to detect voice and dual-tone multi-frequency (DTMF) keypad inputs. Interactive Voice Response (IVR) is utilized by entities to route telephone calls and provide over-the-phone services such as over-the-phone payments.

Mobile application 132 and 162 refer to an application programs that runs on mobile devices and enable the mobile devices to perform some specific tasks. For example, a mobile application may enable a user to use his mobile device to communicate with a server computer and perform a payment transaction.

Short Messaging Service (SMS) 133 refers to a messaging service that allows messages be sent and received by mobile devices. A typical SMS message can allow users to send up to 160 character per message.

Unstructured Supplementary Service Data phase 2 (USSD2) 134 refers to a capability built into the Global System for Mobile communication (GSM) standard for support of the transmission of information over channels of GSM network. USSD2 provides session based communication capability, thereby enabling a variety of applications. USSD2 also allows for network-initiated operation (pulls and push operation).

Mobile web 135 and 164 refer to use of a mobile devices incorporating a web browsers to access the Internet. Mobile web 135 and 164 may also refer to websites that are designed and formatted to be viewed on mobile devices.

Customer Service Representative (CSR) 136 refers to an individual working for an entity (e.g., merchant 130, issuer 160, or payment processing network 150) who is tasked with various costumer service related duties. In some embodiments, a Customer Service Representative (CSR) 136 may communicate with the user 110 and facilitate the authentication of a payment transaction.

Merchant Plug-In (MPI) 137 may be a component that operates in an acquirer domain in some embodiments. In the online environment it performs various authentication functions on behalf of the merchant. Such functions may include determining whether authentication is available for a card number, and validating a digital signature in an authentication message. The merchant plug-in may be embodied by suitable hardware and/or software that are accessible to merchant.

Acquirer 140 refers to any suitable entity that has an account with merchant 130. In some embodiments, issuer 160 may also be acquirer 140.

Payment processing network 150 refers to a network of suitable entities that have information related to an account associated with the user 110 and/or a portable consumer device. This information includes data associated with the account on portable consumer device such as profile information, data, and other suitable information.

Payment processing network 150 may have or operate a server computer (e.g. server computer 151) and may include a database. The database may include any hardware, software, firmware, or combination of the preceding for storing and facilitating retrieval of information. Also, the database may use any of a variety of data structures, arrangements, and compilations to store and facilitate retrieval of information. The server computer 151 may be coupled to the database and may include any hardware, software, other logic, or combination of the preceding for servicing the requests from one or more client computers. Server computer 151 may comprises one or more computational apparatuses and may use any of a variety of computing structures, arrangements, and compilations for servicing the requests from one or more client computers.

Payment processing network 150 may include data processing subsystems, networks, and operations used to support and deliver authorization services, exception file services, and clearing and settlement services. An exemplary payment processing network 150 may include VisaNet™. Networks that include VisaNet™ are able to process credit card transactions, debit card transactions, and other types of commercial transactions. VisaNet™, in particular, includes an integrated payments system (Integrated Payments system) that processes authorization requests and a Base II system which performs clearing and settlement services. Payment processing network 150 may use any suitable wired or wireless network, including the Internet.

Mobile device profile database 152 refers to a database accessible by the payment processing network 150 that stores characteristics of the mobile devices of users. Data stored in a mobile device profile indicates what type of mobile device is used by a user and what are the available communication channels of that mobile device and what are the data transfer protocols of those communication channels.

Merchant profile database 153 refers to a database accessible by the payment processing network 150 that stores various data and information related to the merchants. Merchant profile database 153 may store lists of available communication channels that may be used by the merchants as initiation channel for transactions, and location of the merchants, among other information.

User profile database 154 refers to a database accessible by the payment processing network 150 that stores various data related to the accounts of users. User profile database 154 may store lists of one more accounts that users have with various issuers, and enrollment records related to various enrollment-based programs provided by the issuers or the payment processing network 150.

Issuer profile database 155 refers to a database accessible by the payment processing network 150 that stores various data related to the issuers that communicate with the payment processing network 150. Issuer profile database 155 may store lists of one or more communication channels that may be used by the issuers as authentication channel for authenticating the payment transactions, and the location of the issuers, among other information.

Databases 152, 153, 154, and 155 may be server computers that are capable of storing data and responding to queries from client computers. These databases may also be in the form of stand-alone hard drives connected to one or more server computers that retrieve the data from these databases as result of queries from client computers.

Issuer 160 refers to any suitable entity that may open and maintain an account associated with a portable consumer device (not shown) for user 110. Some examples of issuers may be a bank, a business entity such as a retail store, or a governmental entity. In many cases, issuer 160 may also issue portable consumer devices associated with the account to user 110.

Access Control Server (ACS) 165 can provide issuers with the ability to authenticate presenters (e.g., users) during a payment transaction such as a remote or face-to-face purchase transaction.

Remote service 170 refers to a suitable entity in communication with the payment processing network 150 that receives a payment initiation request from merchant 130, queries various databases through the payment processing network 150 and determines a list of eligible accounts and authentication channels that may be used by merchant 130 and mobile device 120 for authentication of a payment transaction. Remote service 170 also redirects an authentication request that it receives from merchant 130 to issuer 160. Remote service 170 includes one or more server computers, such as server computer 171, computer readable mediums (not shown) coupled with the server computers, and software applications stored on the computer readable mediums that work in concert to perform various operations of the remote service 170.

Network 180 may be any suitable network (for example, Internet) for communication between various entities shown in FIGS. 1 and 2.

II. Method

Referring to FIG. 1, in a purchase transaction, user 110 purchases goods or services from the merchant 130 by presenting his account information to the merchant 130. In remote payment transactions, user 110 may submit his account information by typing it in a payment webpage of a merchant website or by using a payment application running on a mobile device or a user computer. The user 110 may also utilize various other means, in a remote payment transaction, to submit his account information to the merchant 130. For example, user 110 may contact a customer service representative, communicate with a interactive voice response system or use SMS on his mobile device.

When the merchant 130 receives the account information of the user 110, it generates an authorization request message and forwards that authorization request message to acquire 140. An "authorization request message" can refer to a message that may be sent to an issuer, who approves or does not approve of a transaction. It may include information including a transaction amount, an account number (including a bank identification number), an expiration date, and verification values. Acquirer 140 sends the authorization request message to the payment processing network 150 which passes the authorization request message to the issuer 160. Issuer 160 generates an authorization response message that indicates whether the transaction is approved or declined. The issuer 160 then sends the authorization response message to the payment processing network 150. The payment processing network 150 sends the authorization response message to the acquirer 140 who informs the merchant 130 about the result.

The intelligent authentication system may be used before or during a payment transaction to determine a suitable authentication channel that may be used by the issuer 160 to authenticate the payment transaction. In some embodiments, the determination process may be performed when an authorization request message is received from the merchant 130. In these embodiments, issuer 160 will start the authentication process when it receives an authorization request message from the payment processing network 150.

In some other embodiments, the determination process may be preformed before merchant 130 generates an authorization request message. In these embodiments, the intelligent authentication system first determines a list of available authentication channels that may be used by the issuer 160 to communicate with the user 110 and then the result is submitted to the merchant 130. Merchant 130 presents the list to the user 110. Once the user 110 selects one of the authentication channels, it is then submitted by the merchant 130 to the remote service 170. Remote service 170 sends the selected authentication channel to issuer 160. Issuer 160 then communicates with user 110 to authenticate the payment transaction. Once the payment transaction is authenticated, the merchant 130 generates an authorization request message that will be passed to the issuer 160 for approval.

In some embodiments, use of the intelligent authentication system may be enrollment based. User 110 communicates with the issuer 160 and/or payment processing network 150 and enrolls in the intelligent authentication system. During an enrollment process, user 110 may specify one or more particular account numbers that will be used with the intelligent authentication system. Also, during the enrollment process, user 110 may be asked to provide information about the characteristics of the mobile device 120 that the user 110 may use for transactions. Such information may be stored in one or more databases that contain the data associated with the users, their financial information and their device characteristics. In some embodiments, information about the mobile device of user 110 such as type of the mobile device 120, capability of the mobile device 120 in using various communication channels and data transfer protocols, etc. are stored in the mobile device profile database 152. In some embodiments, enrollment data and account numbers enrolled in the system may be stored in user profile database 154.

In some embodiments, user 110 may designate a Consumer Payment Nickname (CPN) to each of the account numbers that the user 110 is enrolling into the intelligent authentication system. For example, user 110 may decide to designate a particular "nickname" to each of the account numbers that are being enrolled. In one example, if user 110 is enrolling two accounts from two different issuers, user 110 may choose the name of the issuers as a nickname for the accounts. In this example, user 110 may decide to name one of the accounts as "Capital One" and the other one as "Chase." The consumer Payment Nicknames (CPN) may be saved in the user profile database 154.

It will be understood by those skilled in the art that although various databases are shown in FIG. 2 to be in the payment processing network 150, such databases may be in a remote location while being accessible by the payment processing network 150. Moreover, it will be further understood by those skilled the art that various databases shown in FIG. 2 may be embodied as one database that stores the mobile device profile, the merchant profile, user profile and issuer profile, in addition to other data.

Figure 3:
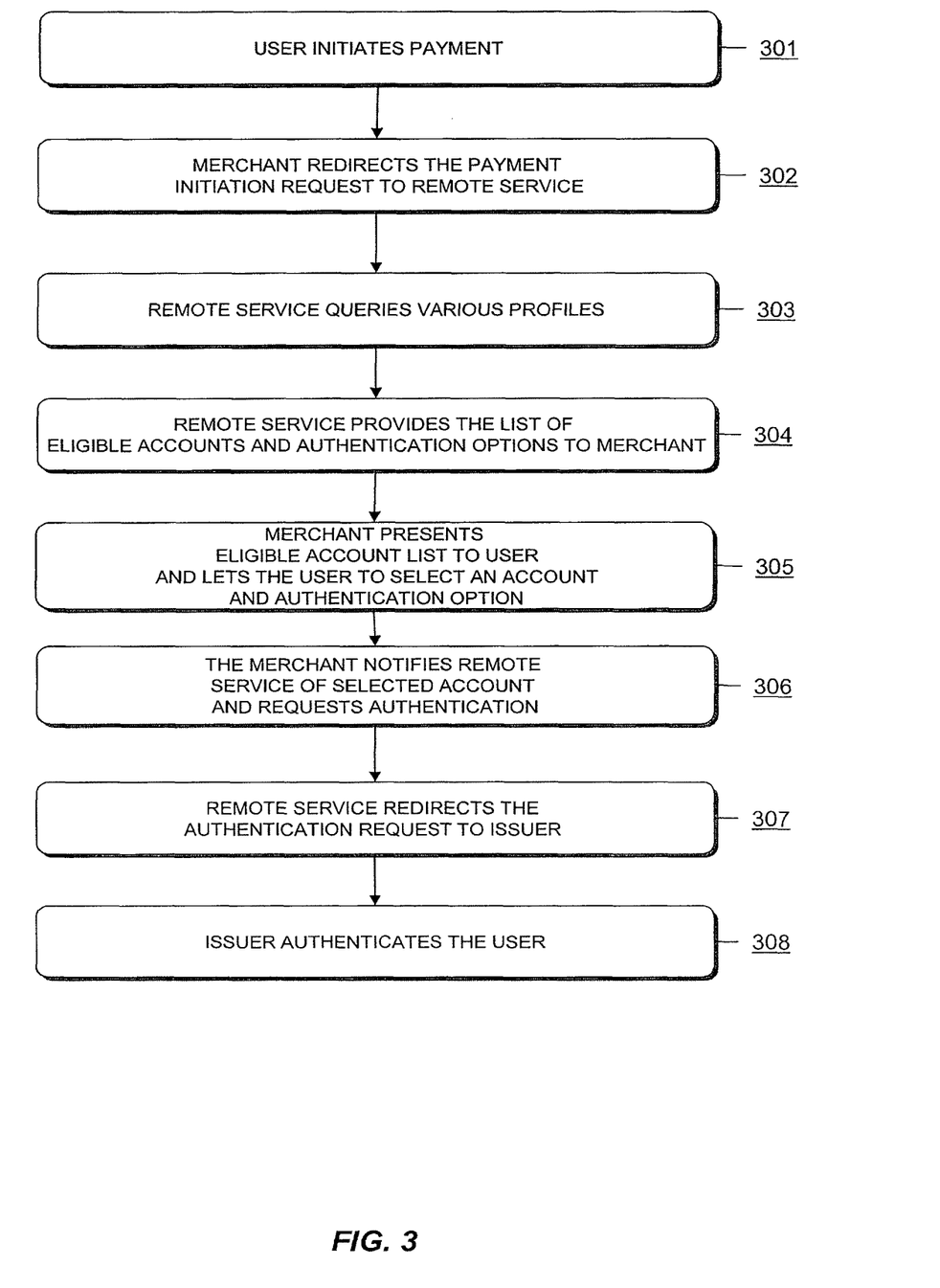
FIG. 3 shows a flowchart illustrating the steps involved in the using the intelligent authentication system according to an embodiment of the invention.

FIG. 3 is a flowchart that illustrates the steps involved in determining a suitable authentication channel for authenticating a payment transaction via a mobile device using the intelligent authentication system shown in FIG. 2.

Referring to FIG. 2, user 110 initiates a payment transaction with the merchant 130. This is shown as step 301 in FIG. 3. In some embodiments, user 110 may use the mobile device 120 to perform a remote payment transaction. User 110 initiates the payment transaction via a supported initiation channel (some of which are shown in FIG. 2). In one example, user 110 may use mobile device 120 to perform a payment transaction using the mobile application 132. In another example, user 110 may use interactive voice response (IVR) 131 to perform a payment transaction.

When merchant 130 receives the payment initiation request, it redirects the payment initiation request to the remote service 170 (step 302). In some embodiments, the payment initiation request may be sent to the remote service 170 before an authorization request message is generated or it may be part of an authorization request message. In embodiments where users are able to enroll one or more of their accounts and assign a Consumer Payment Nickname (CPN) to each of their accounts, merchant 130 may not generate an authorization request message when it receives the payment initiation request and wait until a list of available/eligible accounts and a list of available authentication channels are received from the remote service 170. The merchant 130 can present the list of available/eligible accounts in form of their corresponding Consumer Payment Nicknames (CPN) and available authentication channel for each one to the user 110. Once the user 110 chooses one of the accounts and an authentication channel for that account, the merchant 130 (or more specifically, an access device or a server computer at the merchant) then generates an authorization request message that will be routed to the issuer associated with the selected account.

When remote service 170 receives the payment initiation request, it queries various databases to determine a list of suitable authentication channels and eligible Consumer Payment Nicknames (CPNs) (i.e. accounts). This is shown as step 303 in FIG. 3. In some embodiments, which authentication channels are available may depend on which Consumer Payment Nickname (CPN) is selected. In some embodiments, since each Consumer Payment Nickname (CPN) may be associated with an issuer and availability of authentication channels for each issuer may differ, the remote service 170 determines/generates a list of available authentication for each of the Consumer Payment Nicknames (CPNs).

In one example, user 110 initiates a payment transaction with the merchant 130 using his mobile device 120 via the mobile web 135. The merchant receives a payment initiation request from the mobile device 120 of user 110 via a server computer (not shown) accessible by the merchant 130 that hosts the mobile web 135. The server computer sends the payment initiation request to the server computer 171 accessible by the remote service 170. Server computer 171 communicates with the server computer 151 and receives a list of available/eligible accounts for user 110 and the authentication channels for each account that may be used for the payment transaction. These available/eligible accounts were previously enrolled in the intelligent authentication system by the user 110. Also, server computer 151 communicates with the issuer profile database 155 to determine what are the supported/preferred authentication channels for each of the available/eligible account of the user 110.

Server computer 171 provides this list to the server computer accessible the merchant that runs the mobile web 135. The server computer then presents the list via mobile web 135 to user 110. User 110 chooses one of the available/eligible accounts and an authentication channel associated with that account using his mobile device 120.

Once the user 110 makes this selection, the server computer accessible by the merchant or any other appropriate computer system and/or access device generates an authorization request message and forwards that authorization request message to the remote service 170 and/or payment processing network 150. At this point, a server computer (not shown) accessible by the issuer 160 receives the authorization request message from the remote service 170 and/or the payment processing network 150.

In some embodiments, an application program stored on the server computer 171, which is in communication with the payment processing network 150, queries various databases such as mobile device profile database 152, merchant profile database 153, user profile database 154, and issuer profile database 155, and determines one or more communication channels, available for use by the mobile device 120 and issuer 160, that can be used for authenticating the transaction.

In some embodiments, data stored in the mobile device profile database 152 indicates the types of communication channels that are available for the mobile device 120. In some other embodiments, the communication channels of the mobile device 120 may be identified by receiving a device characteristic indicator from the merchant 130. When the user 110 initiates the payment with the merchant 130 (step 301), a server computer or an access device in the merchant 130 may receive a device characteristic indicator from the mobile device 120 of the user 110 and send the device characteristic indicator to the remote service 170 along with the payment initiation request.

In one example, user 110 uses the mobile web 135 to purchase goods or services from the merchant 130. Merchant 130 may receive a device characteristic indicator from the mobile device 120. The device characteristics indicator may be in the form of a type, model and/or serial number of the mobile device 120 which will be received by a server computer operated by the merchant 130 that extracts such information from the mobile device 120 when it communicates with the merchant 130 through mobile web 135.

In another example, user 110 may use a merchant website to purchase goods or services from the merchant 130. The merchant 130 may receive a phone number associated with the mobile device 120 from the user 110, and sends the phone number of the mobile device 120 to remote service 170. Remote service 170 may communicate with a carrier that provides cellular data communication capability for the mobile device 120 to determine the type of the mobile device 120 and communication channels and data transfer protocols that are available for use by the mobile device 120.

The application program stored on the server computer 171 also compares the communication channels that are available for use by the mobile device 120, with the communication channels that may be used by the issuer 160, to authenticate the transaction, and determines a list of available communication channels that may be used by the mobile device 120 as authentication channels to authenticate the payment transaction.

In some embodiments, additional factors may also play a role in determining which communication channels may be used as authentication channels for authenticating a payment transaction. Remote service 170 may consider some criteria that govern the selection of one or more suitable communication channels for authentication of the payment transaction. Such criteria may include regional limitations, initiation channels used by the users to reach the merchant, type of the transaction, amount of the transaction, issuer imposed criteria.

In some embodiments, it may be preferable to authenticate a payment transaction via the same communication channel that was used by the user 110 as an initiation channel to initiate the payment transaction. In some other embodiments, the availability of various communication channels based in the region in which the transaction is taking place may be considered. In a payment transaction, the region where the transaction is initiated may be different from where the issuer is located, and this regional difference may translate into different communication standards among different regions which may limit the number of communication channels that may be used between mobile device 120 and issuer 160 to authenticate the payment transaction.

In other embodiments, issuer 160 may prefer to set some criteria for authenticating the payment transactions based on the type of the transaction and/or the amount of the payment transaction. For example, issuer 160 may determine that if a payment transaction is above a predetermined threshold, one or more particular types of communication channels should be used as authentication channels for authenticating the payment transaction.

In one example, if a payment transaction is above a certain limit, issuer 160 may want to authenticate the payment transaction via an Interactive Voice Response system (IVR) 161. In this example, at some point after the initiation of payment by user 110, the user 110 will be notified by the merchant 130 that the user 110 will receive a phone call for authentication of the payment transaction. In some embodiments, the merchant 130 may provide a phone number that user 110 can call and perform the authentication. User 110 will then communicates with the Interactive Voice Response (IVR) 161 and will be asked to provide some information. The user 110 may speak his answers, or in some cases, key in some information. The issuer 160 will then authenticate the user 110 and authorizes the payment transaction.

Referring back to FIG. 3, after remote service 170 determines and generates a list of available/eligible accounts and authentication channels, it then provides the list to the merchant 130. This is shown as step 304 in the flowchart of FIG. 3. In some embodiments, the server computer 171 communicates with a client computer (not shown) in the merchant 130 and provides the list of available authentication channels and enrolled accounts of the user 110 in form of an electronic file.

When the merchant 130 receives the list of available authentication channels and enrolled accounts (i.e. Consumer Payment Nicknames (CPNs)), the merchant 130 presents the list to the user 110 and lets the user 110 to select an account and an authentication channel for that account. This is shown as step 305 in the flowchart of FIG. 3. In some embodiments, the list is presented to the user 110 over the payment initiation channel that was used earlier by the user 110 to initiate a payment transaction. In other embodiments, the list may be presented to the user 110 via other means accessible by the user. For example, if user 110 uses a computer to connect to a merchant website and initiate the payment transaction, then he may receive a notification on his mobile device 120 about the available/eligible accounts and authentication channels.

When user 110 selects one of the eligible accounts and an authentication channel for that account, merchant 130 notifies the remote service 170 of the selected account and the authentication channel, and requests for authentication. This is shown as step 306 in the flowchart of FIG. 3. Remote service 170 then redirects the authentication request to issuer 160 or any other issuer associated with the selected account (i.e. Consumer Payment Nickname (CPN)). This is shown as step 307 in FIG. 3.

In some embodiments, remote service 170 provides information needed by the issuer 160 to communicate with the user 110. For example, remote service 170 may provide a phone number associated with the mobile device 120 of user 110 so that issuer 160 can communicate with the user 110 and authenticate the payment transaction. In some other embodiments, issuer 160 may possess the needed information to communicate with the user 110.

In some embodiments, where an Internet based communication channel such as mobile application 132 or mobile web 135 is selected as the authentication channel by the user 110, remote service 170 may provide the capability to the issuer 160 to connect to that authentication channel and authenticate the payment transaction. In some other embodiments, remote service 170 or merchant 130 may authenticate the payment transaction on behalf of the issuer 160.

Issuer 160 then starts the authentication process by communicating with the user 110 via the selected authentication channel. This is shown as step 308 in FIG. 3.

In one example issuer 160 authenticates the user 110 via Interactive Voice Response (IVR) 161. In this example, user 110 may receive a phone call from the Interactive Voice Response (IVR) system 161 and be asked to provide some information that is used by the Interactive Voice Response (IVR) system 161 to determine that the authorization request message is related to a transaction initiated by the user 110 and is authentic. Once the payment transaction is authenticated, a server computer accessible by the issuer 160 generates an authorization response message which is sent to the payment processing network 150. Payment processing network 150 then sends the authorization response message to the acquirer 140. Thereafter, acquirer 140 forwards the authorization response message to the merchant 130. Merchant 130 then notifies the user 110 that the payment transaction has been approved.

It can be appreciated that the embodiments of the invention provide many advantages. Embodiments of the invention provide for the ability of authenticating payment transactions for the issuers, to reduce the occurrence of fraudulent payment transactions, by determining a suitable communication channel to be used as an authentication channel. Embodiments of the invention also consider various factors to determine which of the communication channels are best suited for authentication of a payment transaction. By using the intelligent authentication system, issuers can authenticate a payment transaction in an efficient and secure manner. Users will also benefit by conveniently receiving a list of options that they can choose from and finalize the payment transaction.

Figure 4:
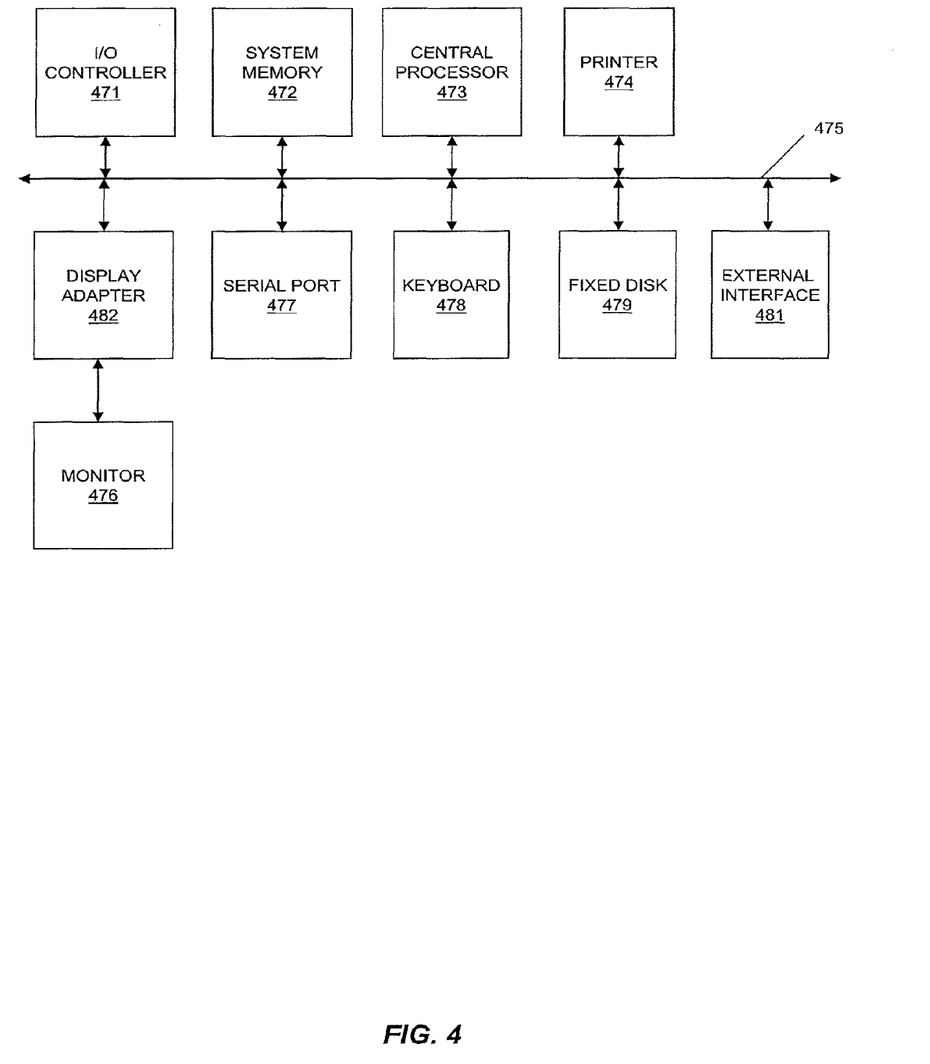
FIG. 4 shows a system according to an embodiment of the invention.

The various participants and elements in the previously described system diagrams (e.g., the issuers, servers, databases, etc. in FIGS. 1, 2, and 3) may use any suitable number of subsystems to facilitate the functions described herein. Examples of such subsystems or components are shown in FIG. 4. The subsystems shown in FIG. 4 are interconnected via a system bus 475. Additional subsystems such as a printer 474, keyboard 478, fixed disk 479 (or other memory comprising computer-readable media), monitor 476, which is coupled to display adapter 482, and others are shown. Peripherals and input/output (I/O) devices, which couple to I/O controller 471, can be connected to the computer system by any number of means known in the art, such as serial port 477. For example, serial port 477 or external interface 481 can be used to connect the computer apparatus to a wide area network such as the Internet, a mouse input device, or a scanner. The interconnection via system bus allows the central processor 473 to communicate with each subsystem and to control the execution of instructions from system memory 472 or the fixed disk 479, as well as the exchange of information between subsystems. The system memory 472 and/or the fixed disk 479 may embody a computer-readable medium.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

In embodiments, any of the entities described herein may be embodied by a computer that performs any or all of the functions and steps disclosed.

Any recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for selecting an authentication channel and authenticating a payment transaction via the authentication channel, the method comprising:
receiving an authentication request for a payment transaction from a server computer;
determining a set of authentication channels available to the authorizing entity;
determining, from the authentication request, a mobile device to be associated with the payment transaction and one or more capabilities associated with the mobile device;
determining a set of authentication channels available to the mobile device associated with the payment transaction based on the one or more capabilities determined to be associated with the mobile device;
identifying a subset of authentication channels including authentication channels in both the set of authentication channels available to the authorizing entity and the set of authentication channels available to the mobile device associated with the payment transaction;
providing the subset of authentication channels to the mobile device;
receiving, from the mobile device, a selected authentication channel from the subset of authentication channels after selection of the selected authentication channel via a graphical user interface of the mobile device;
initiating communication with the mobile device via the selected authentication channel;
initiating communication with the authorization entity via the selected authentication channel; and
routing, via the selected authentication channel, an authentication response from the mobile device to the authorization entity, such that the payment transaction is authenticated by the authorization entity in response to receiving the authentication response from the mobile device.

2. The method of claim 1, further comprising:
generating an authorization response message when the payment transaction is authenticated; and
sending the authorization response message to a payment processing network.

3. The method of claim 1, further comprising:
receiving an authorization request message from a payment processing network, wherein the authorization request message includes a transaction amount, an account number, an expiration date, and verification values corresponding to the payment transaction.

4. The method of claim 1, further comprising:
communicating with the mobile device when a user associated with the mobile device conducts an enrollment process prior to the payment transaction.

5. The method of claim 4, wherein the user provides one or more accounts numbers and information about the mobile device during the enrollment process.

6. The method of claim 5, further comprising:
identifying, from the mobile device information, a type of the mobile device; and
determining, based at least in part on the type of mobile device, at least one capability of the mobile device in using various communication channels.

7. The method of claim 5, wherein the user further provides aliases for each of the one or more account numbers.

8. The method of claim 5, wherein information provided by the user during the enrollment process is stored in one or more databases accessible by a payment processing network.

9. The method of claim 1, further comprising:
setting criteria for authenticating the payment transaction based on the type or amount of the transaction.

10. The method of claim 9, further comprising:
determining whether the payment transaction is above a predetermined threshold; and
if the payment transaction is above the predetermined threshold, determining one or more types of communication channels to be used as authentication channels for authenticating the payment transaction.

11. A computer comprising:
a processor;
a memory element comprising code, executable by the processor, for implementing a method comprising:
receiving an authentication request for a payment transaction from a server computer;
determining, from the authentication request, a mobile device to be associated with the payment transaction and one or more capabilities associated with the mobile device;
identifying a set of authentication channels available to an authorizing entity and available to the mobile device associated with the payment transaction based on the one or more capabilities determined to be associated with the mobile device;
providing the set of authentication channels to the mobile device;
receiving a selected authentication channel from the mobile device for authentication of the payment transaction;
establishing a first communication session with the mobile device via the selected authentication channel;
establishing a second communication session with the authorizing entity;
routing the authentication request to the mobile device via the first communication session; and
routing an authentication response from the mobile device to the authorizing entity via the first communication session and the second communication session.

12. The computer of claim 11, wherein the method further comprises:
generating an authorization response message when the payment transaction is authenticated; and
sending the authorization response message to a payment processing network.

13. The computer of claim 11, wherein the method further comprises:
receiving an authorization request message from a payment processing network, wherein the authorization request message includes a transaction amount, an account number, an expiration date, and verification values corresponding to the payment transaction.

14. The computer of claim 11, wherein the method further comprises:
communicating with the mobile device when a user conducts an enrollment process prior to the payment transaction.

15. The computer of claim 14, wherein the user provides one or more accounts numbers and information about the mobile device during the enrollment process.

16. The computer of claim 15, wherein the mobile device information includes the type of the mobile device and capability of the mobile device in using various communication channels.

17. The computer of claim 15, wherein the user further provides aliases for each of the one or more account numbers.

18. The computer of claim 15, wherein information provided by the user during the enrollment process is stored in one or more databases accessible by a payment processing network.

19. The computer of claim 11, wherein the method further comprises:
   setting criteria for authenticating the payment transaction based on the type or amount of the transaction.

20. The computer of claim 19, wherein the method further comprises:
   determining whether the payment transaction is above a predetermined threshold; and
   if the payment transaction is above the predetermined threshold, determining one or more types of communication channels to be used as authentication channels for authenticating the payment transaction.

21. The method of claim 6, wherein the list of authentication channels available includes the various communication channels that the mobile device is determined to be capable of using.

* * * * *